US006990479B2

(12) United States Patent
Cha

(10) Patent No.: US 6,990,479 B2
(45) Date of Patent: Jan. 24, 2006

(54) COMMUNICATION SYSTEM AND METHOD OF NON-INTRUSIVE PERFORMANCE DATA POLLING

(75) Inventor: Jeong-Ho Cha, Youngin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 474 days.

(21) Appl. No.: 10/197,869

(22) Filed: Jul. 19, 2002

(65) Prior Publication Data

US 2003/0068028 A1    Apr. 10, 2003

(30) Foreign Application Priority Data

Oct. 4, 2001   (KR)   ................ 2001-61228
Feb. 1, 2002   (KR)   ................ 2002-5952

(51) Int. Cl.
*G06F 17/30* (2006.01)
(52) U.S. Cl. .............. 707/1; 707/100; 707/103 R; 707/104.1; 709/102; 709/248; 718/100; 718/107; 718/108
(58) Field of Classification Search .............. 707/1, 707/103 R, 100, 104.1; 709/102, 203, 208, 709/224, 232, 248; 710/48, 109; 717/139, 717/148, 158, 162; 718/100, 107, 108, 228; 701/260
See application file for complete search history.

(56) References Cited

U.S. PATENT DOCUMENTS

| 4,638,428 A | * | 1/1987 | Gemma et al. ............ 710/241 |
| 4,683,531 A | * | 7/1987 | Kelch et al. ............. 710/109 |
| 5,132,680 A | * | 7/1992 | Tezuka et al. ............ 340/3.51 |
| 5,347,515 A | * | 9/1994 | Marino .................... 370/447 |
| 5,586,056 A | * | 12/1996 | Watanabe .............. 340/825.52 |
| 5,774,732 A | * | 6/1998 | Doumard ................. 710/220 |
| 5,815,660 A | * | 9/1998 | Momona .................. 709/208 |
| 5,826,046 A | * | 10/1998 | Nguyen et al. ........... 710/305 |

OTHER PUBLICATIONS

John A. Trono et al.: Further comments on "A correct and unrestrictive implementation of general semaphores", Jul. 2000, ACM Press, vol. 34, issue 3, pp. 5-10.*
Jim Abu-Ras: "Optimal Mutex Policy in Ada 95", Dec. 1995, ACM Press, vol. XV, issue 6, pp. 46-56.*
Prasal Jayanti et al. "Fair Group Mutual Exclusion", year 2003, ACM Press, pp. 275-284.*
Eyal Kushilevitz et al.: " Randomized Mutual Exclusion Algorithm Revisited", year 1992, ACM Press, pp. 275-283.*

* cited by examiner

*Primary Examiner*—Jeffrey Gaffin
*Assistant Examiner*—Jacques Veillard
(74) *Attorney, Agent, or Firm*—Robert E. Bushnell, Esq.

(57) ABSTRACT

The present invention discloses a communication system including an entire object including multiple objects connected with the networks and storing the object's own data, a database including a polling table storing information for an object being performed data polling among the multiple objects, and a mapping controller for controlling data flows of the entire object, and of the object of the polling table in the database, where the mapping controller includes a configuration module for performing data polling to, and for managing the entire object, a performance module for managing performance data of the entire object and for each of the objects, a performance-polling module for calculating performance data by an alarm information for an object having troubles among the entire objects, for receiving the performance data accumulated in the entire object periodically, and for informing the received performance data to the performance module, and a mutual exclusion module for determining priority among each of the modules in the competitive data polling relation within the main controller.

15 Claims, 3 Drawing Sheets

COMMUNICATION SYSTEM AND METHOD OF NON-INTRUSIVE PERFORMANCE DATA POLLING

CLAIM OF PRIORITY

This application makes reference to, incorporates the same herein, and claims all benefits accruing under 35 U.S.C. §119 from applications for NON INTRUSIVE PERFORMANCE DATA POLLING METHOD earlier filed in the Korean Industrial Property Office on the 4th of Oct. 2001 and there duly assigned Ser. No. 2001-61228, and for NON INTRUSIVE PERFORMANCE DATA POLLING METHOD AND COMMUNICATION SYSTEM THEREOF earlier filed in the Korean Industrial Property Office on the 1st of Feb. 2002 and there duly assigned Serial No. 2002-5952.

BACKGROUND OF THE INVENTION

1. Field of the Invention

The present invention relates to a communication system, and more particularly, to a communication system and a method of non-intrusive performance data polling for a predetermined object.

2. Description of the Related Art

Generally, A communication system, such as a switchboard, includes an input/output-line mapping unit, a switching unit, and a main controller.

An input-line mapping unit is related to an entire object in the conventional communication system, where the input/output-line mapping unit includes a usage parameter control (i.e., "UPC"), a head converter (i.e., "HCV"), an operation, administration and management (i.e., "OAM").

The UPC monitors object flows in each connection, in other words the number of the objects per second, and the HCV converts a virtual channel identification (i.e., "VCI") transmitted from the network to another VCI outputted to a switching unit or an output transmission line. Additionally, the OAM monitors whether a transmission line or a communication system is operated normally or not, or watches performance data, such as data loss or operation errors. Each of the objects is a unit connected with a communication system, and supplies various data including performance data.

By referring to header information of an object, the switching unit (not shown) routes, in other words sets virtual channel to, an output transmission line to a destination address, and the main controller controls values converted from header information to manage a communication system failure or the communication system itself.

In more details, the OAM includes a configuration task (i.e., "CT"), an alarm polling task (i.e., "APT"), an alarm task (i.e., "AT"), a performance polling task (i.e., "PPT"), and a performance task (i.e., "PT").

The configuration task (i.e., "CT") manages the OAM, the alarm task (i.e., "AT") manages present alarms and warnings. The alarm-polling task (i.e., "APT") monitors alarm information of an object generating an alarm, and transmits the alarm information to the AT. The performance task (i.e., "PT") manages performance data. Additionally, the performance polling task (i.e., "PPT") calculates performance data by alarm information for system hardware, or reads periodically the performance data accumulated on the system hardware to transmit the performance data to the performance task (i.e., "PT").

The performance data includes an error second (i.e., "eS"), a severely error second (i.e., "sES"), a unavailable second (i.e., "uAS"), a code violation (i.e., "cV"), and so on, while such data are stored in a memory device in each of the objects.

The above described communication system gets performance data from each of the objects to calculate or accumulate the entire performance data for communication equipment.

In the conventional system, for monitoring performance data of a predetermined object continuously, the performance polling task (i.e., "PPT") searches an entire object. However, when other task in competitive relation with the PPT, such as the configuration task (i.e., "CT"), performs configuration data polling to the predetermined object, it frequently happens that the performance polling task (i.e., "PPT") cannot perform performance data polling for the predetermined object, but another object instead of the predetermined object from the entire object.

In other words, in the case of the communication system including the entire object including each object OB1, OB2, . . . , OBn, when the performance polling task performs performance data polling for each object OB1, OB2, . . . , OBn while the configuration task (i.e., "CT") operates, it frequently happens to perform the performance data polling incorrectly.

Therefore, the performance polling task (i.e., "PPT") can get time loss due to delay in searching the entire object, and another object when the predetermined object is changed to the other object by the configuration task (i.e., CT), for example in a searching order table. In other words, it is hard to get correct performance data because of difficulties in correct calculation or performance data polling for each of the predetermined objects.

SUMMARY OF THE INVENTION

To overcome the above described and other problems, an objective of the preferred embodiments of the present invention is to provide a communication system and method for performing data polling to a predetermined object correctly without considering whether the predetermined object is set or not, or whether the predetermined object is changed or not.

It is another objective of the present invention to perform data polling for the predetermined object correctly, where the present invention can use at least one of a mutex, a semaphore, or a variable treating process, and in a preferred embodiment of the present invention applying the mutex.

It is yet another objective to provide a communication system and method for performing data polling to a predetermined object correctly that is easy to implement, reduces costs, and yet increase efficiency of the system.

In order to achieve the above and other objectives, the preferred embodiments of the present invention provides an entire object including multiple objects, connected with the networks, and storing the multiple object's own data; a database including a polling table storing information for an object being performed data polling among the multiple objects; and a mapping controller for controlling data flows of the entire object, and at least one of the multiple objects of the polling table in the database; wherein the mapping controller includes: a configuration module for performing data polling to, and for managing the entire object; a performance module for managing performance data of the entire object and for each of the multiple objects; a performance-polling module for calculating performance data by an alarm information for an alarm object generating an alarm among the entire objects, for receiving the performance data accumulated in the entire object periodically, and for informing the received performance data to the performance module; and a mutual exclusion module for determining operating priority among all modules in a competitive data polling relation within the mapping controller.

In addition, the mutual exclusion module includes at least one of a mutex, a semaphore, or a variable treating process.

In addition, the controller further includes: an alarm-polling module for performing alarm data polling to the object of the entire object having an alarm; and an alarm module for managing the present alarm information.

In addition, the mapping controller searches and monitors whether a data transmission line or the communication system operates normally or not, and synchronizes with an operation, administration and management (i.e., "OAM") for monitoring whether data loss or operation failure exists or not, wherein the OAM includes: a usage parameter control (i.e., "UPC") for monitoring object flows in each connection, in other words the number of the objects in a second; and a head converter (i.e., "HCV") for converting a virtual channel identification (i.e., "VCI") used in the transmission line to another VCI used in an output transmission line or the corresponding outputs.

The other purpose of the present invention is to provide a non-intrusive performance data polling method in a communication system which includes an entire object including multiple objects, connected with the networks, and storing the multiple object's own data; a database including a polling table storing information for an object being performed data polling among the multiple objects; and a mapping controller for controlling data flows of the entire object, and at least one of the multiple objects of the polling table in the database, wherein the mapping controller includes a configuration module for performing data polling to, and for managing the entire object; a performance module for managing performance data of the entire object and for each of the multiple objects; a performance-polling module for calculating performance data by an alarm information for an alarm object generating an alarm among the entire objects, for receiving the performance data accumulated in the entire object periodically, and for informing the received performance data to the performance module; and a mutual exclusion module for determining operating priority among all modules in a competitive data polling relation within the mapping controller, the method including the steps of: storing the object in the entire object to be monitored to the polling table; and performing data polling to the object in the polling table, adding the object or the object data to the polling table, or deleting the object or the object data from the polling table.

In addition, the mutual exclusion module uses at least one of a mutex, a semaphore, or a variable treating process, in the case of performing data polling to the object in the polling table, adding the object or the object data to the polling table, or deleting the object or the object data from the polling table.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
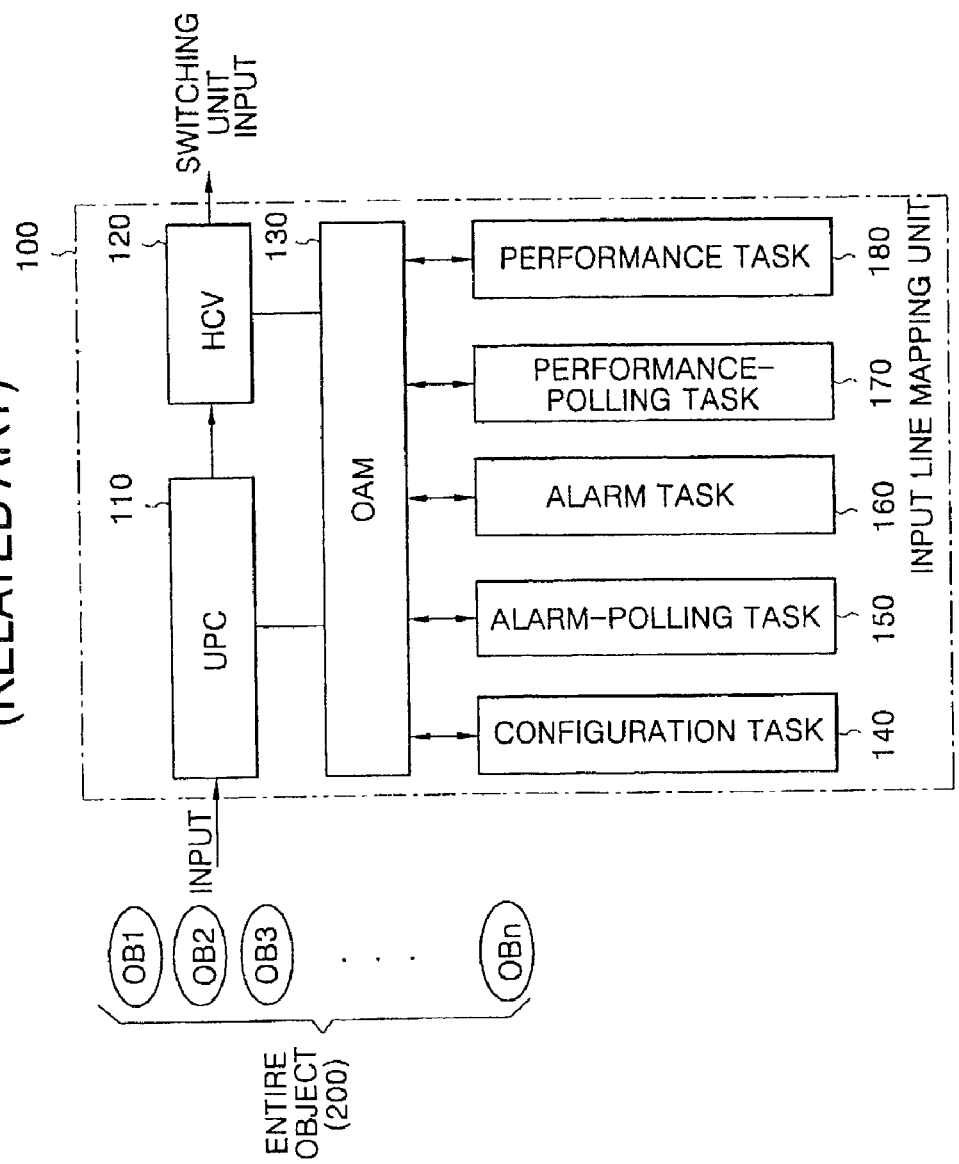
FIG. 1 is a drawing illustrating an input-line mapping unit related to an entire object in the conventional communication system.

FIG. 1 is a drawing illustrating an input-line mapping unit related to an entire object in the conventional communication system.

Referring to FIG. 1, an input/output-line mapping unit 100 includes a usage parameter control (i.e., "UPC") 110, a head converter (i.e., "HCV") 120, an operation, administration and management (i.e., "OAM") 130.

The UPC 110 monitors object flows in each connection, in other words the number of the objects per second, and the HCV 120 converts a virtual channel identification (i.e., "VCI") transmitted from the network to another VCI outputted to a switching unit (not shown) or an output transmission line. Additionally, the OAM 130 monitors whether a transmission line or a communication system is operated normally or not, or watches performance data, such as data loss or operation errors. Each of the objects is a unit connected with a communication system, and supplies various data including performance data.

By referring to header information of an object, the switching unit (not shown) routes, in other words sets virtual channel to, an output transmission line to a destination address, and the main controller (not shown) controls values converted from header information to manage a communication system failure or the communication system itself.

In more details, the OAM 130 includes a configuration task (i.e., "CT") 140, an alarm polling task (i.e., "APT") 150, an alarm task (i.e., "AT") 160, a performance polling task (i.e., "PPT") 170, and a performance task (i.e., "PT") 180.

The configuration task (i.e., "CT") 140 manages the OAM 130, the alarm task (i.e., "AT") 160 manages present alarms and warnings. The alarm-polling task (i.e., "APT") 150 monitors alarm information of an object generating an alarm, and transmits the alarm information to the AT 160. The performance task (i.e., "PT") 180 manages performance data. Additionally, the performance polling task (i.e., "PPT") 170 calculates performance data by alarm information for system hardware, or reads periodically the performance data accumulated on the system hardware to transmit the performance data to the performance task (i.e., "PT") 180.

The performance data includes an error second (i.e., "eS"), a severely error second (i.e., "sES"), a unavailable second (i.e., "uAS"), a code violation (i.e., "cV"), and so on, while such data are stored in a memory device in each of the objects.

The above described communication system gets performance data from each of the objects to calculate or accumulate the entire performance data for communication equipment.

In the conventional system, for monitoring performance data of a predetermined object continuously, the performance polling task (i.e., "PPT") 170 searches an entire object 200. However, when other task in competitive relation with the PPT 170, such as the configuration task (i.e., "CT") 140, performs configuration data polling to the predetermined object, it frequently happens that the performance polling task (i.e., "PPT") 170 cannot perform performance data polling for the predetermined object, but another object instead of the predetermined object from the entire object 200.

In other words, in the case of the communication system including the entire object 200 including each object OB1, OB2, . . . , OBn as shown in FIG. 1, when the performance polling task 170 performs performance data polling for each object OB1, OB2, . . . , OBn while the configuration task (i.e., "CT") 140 operates, it frequently happens to perform the performance data polling incorrectly.

Therefore, the performance polling task (i.e., "PPT") 170 can get time loss due to delay in searching the entire object 200, and another object when the predetermined object is changed to the other object by the configuration task (i.e., CT) 140, for example in a searching order table. In other words, it is hard to get correct performance data because of difficulties in correct calculation or performance data polling for each of the predetermined objects.

Reference will now be made in detail to preferred embodiments of the present invention, example of which is illustrated in the accompanying drawings.

Figure 2:
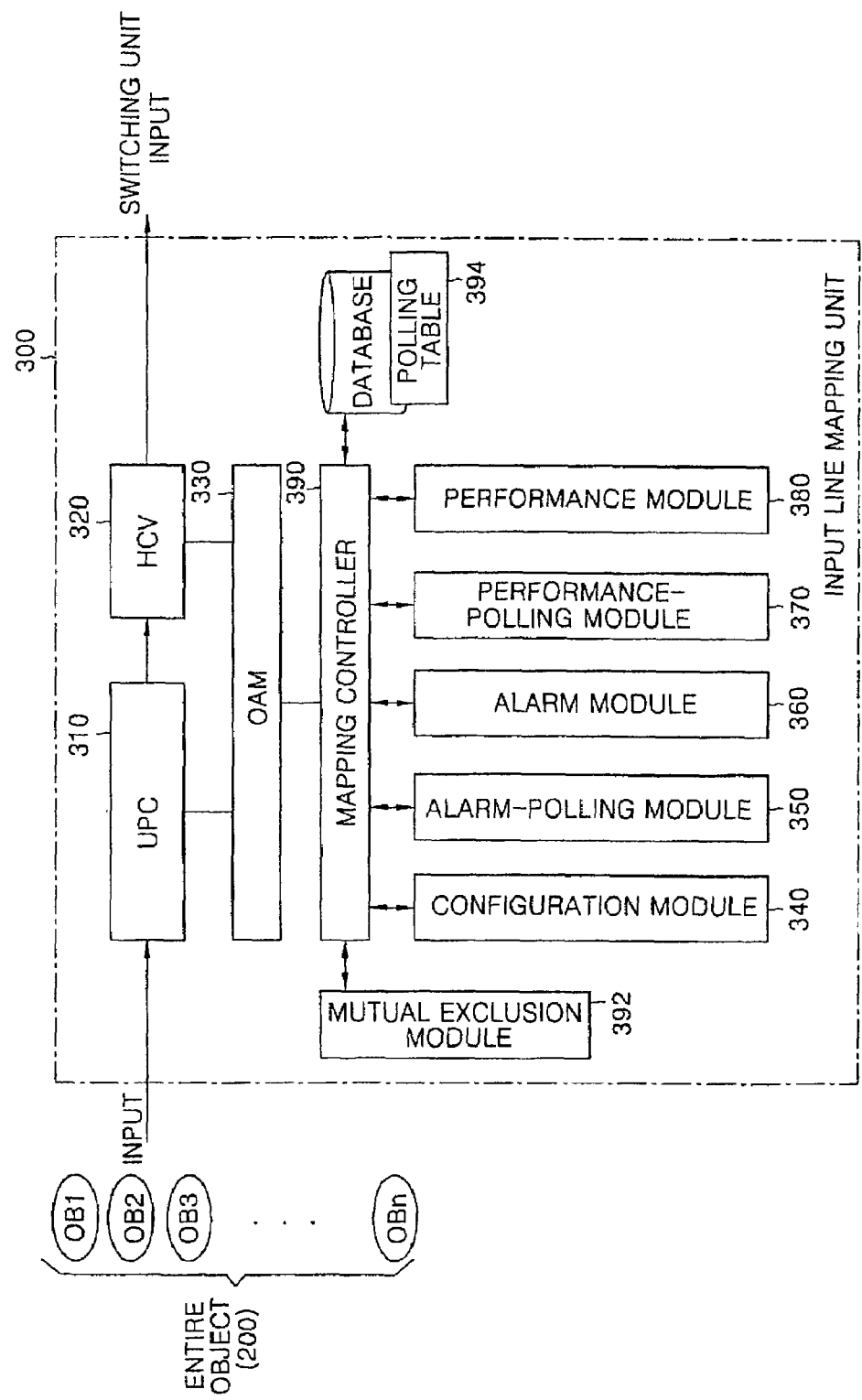
FIG. 2 is a schematic diagram illustrating an input-line mapping unit related to an entire object according to the preferred embodiment of the present invention.

FIG. 2 is a schematic diagram illustrating an input-line mapping unit 300 related to an entire object according to the preferred embodiment of the present invention.

Referring to FIG. 2, the present invention includes an entire object 200 including each object, a mapping controller 390 including a mutual exclusion module 392 such as a mutex (mutual exclusion), and a database 394 including a polling table. Each object of the entire object 200 is connected with the network, and stores corresponding data, for example performance data and management data like configuration data. The polling table of a database 394 contains information for a data polling target, in other words, object in the entire object 200. Repeated illustration for other technical components in FIG. 1 will be avoided.

When the external data is transmitted from the network, each of the objects stores configuration data and performance data, such as an error time (i.e., "eS"), a severely error second (i.e., "sES"), a unavailable second (i.e., "uAS"), a code violation (i.e., "cV"), and so on, to a memory device in each object.

Operation among tasks, in other words modules, will be described in more detail in the following statements.

The communication system of the present invention operates each of the modules, such as a mutual exclusion module 392, a configuration module 340, an alarm-polling module 350, an alarm module 360, a performance-polling module 370, a performance module 380.

Referring to FIG. 2, the entire object 200 includes each object OB1, OB2,; . . . , OBn. When performing performance data polling from objects OB1, OB2, and OB4, the communication system stores the objects OB1, OB2, and OB4 in the polling table.

Sequentially, the performance-polling module 370 requests the mutex to the mutual exclusion module 392 to perform performance data polling for the objects OB1, OB2, and OB4 stored in the polling table of the database 394. When an available mutex exists, the performance-polling module 370 gets the mutex to perform the performance data polling for the objects of the polling table. After completing the performance data polling, the performance-polling module 370 releases the mutex, and waits again for a predetermined time. Sequentially, when the monitoring period returns back again, the above described procedures is repeated again.

The above procedures will be described in more details in the following statements.

Figure 3:
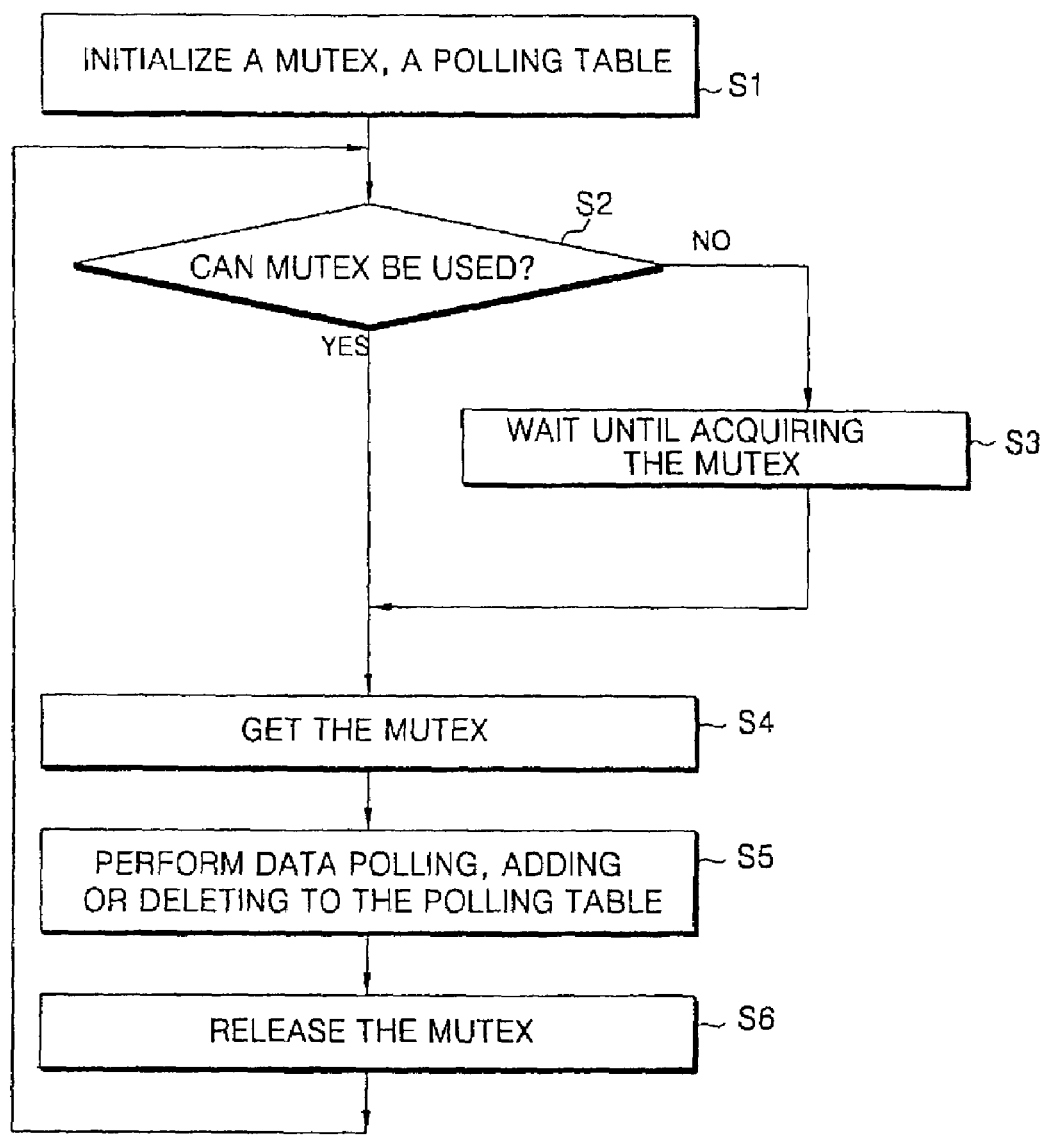
FIG. 3 is a schematic flow chart illustrating a mutex operation according to non-intrusive performance data polling method in FIG. 2.

FIG. 3 is a schematic flow chart illustrating a mutex operation according to non-intrusive performance data polling method in FIG. 2.

Referring to FIG. 3, in a view of software engineering, a predetermined function or a module having the mutex includes the corresponding data exclusively until completing any allocated operation, such as reading, writing, editing, and so on. Therefore, any other function or module in competitive relation with the predetermined function or module cannot perform its own operation, until the predetermined function or module completes the allocated operation and releases the mutex.

Therefore, when the performance-polling module 370 tries to perform performance data polling of the objects from the entire object 200, for example the object of OB1, OB2, OB4, OB6, OB9, and OB10, the mutex and the polling table are initialized, and the object is stored in the polling table (step S1). In this case, it is also possible to store the object in the polling table without initializing the polling table in a view of software engineering. After generating the polling table, to perform performance data polling for the object OB1, the performance-polling module 370 decides whether the mutex can be used or not (step S2).

When the mutex can be used, the performance-polling module 370 gets the mutex (step S4), performs performance data polling for the object OB1 to the polling table (step S5), and releases the mutex (step S6).

Sequentially, the performance-polling module 370 decides whether the released mutex can be used or not (step S2) to perform performance data polling for the next object OB2 in the polling table. When the released mutex can be used, the performance-polling module 370 performs performance data polling for the object OB2 to the polling table (step S5) after getting the mutex (step S4). After completing the performance data polling, the mutex is released again (step S6). The above described performance data polling procedure is repeated to the next object OB4, OB6, OB9, and OB10 in the polling table.

When a predetermined object is added to or deleted from the polling table, the mutex can be also used as shown in FIG. 3.

For example, when the entire object 200 in FIG. 2 includes each object OB1, OB2, OB3, OB4, OB5, OB6, OB7, OB8, OB9, and OB10, and the performance-polling module 370 tries to monitor an object of the entire object 200, for example the monitoring object OB1, OB2, OB4, OB9, OB10 continuously, the monitoring object is stored in the polling table (step S1). When the objects OB3 and OB6 are added to the polling table to be monitored, the performance-polling module 370 decides whether the mutex for the object OB3 can be used or not (step S2). When the mutex can be used, the performance-polling module 370 gets the mutex (step S4), and stores the object OB3 to the polling table (step S5)

In the above step S5 of FIG. 3, another module, such as a configuration module 340, cannot change the object OB3, because the performance-polling module 370 gets the mutex for the object OB3. Therefore, the object OB3 is added to the polling table (step S5), and the performance-polling module 370 releases the mutex (step S6). Then, the released mutex belongs to a module having a high priority between the performance-polling module 370 trying to add the next object OB6 to the polling table, and the configuration module 340 trying to change the object OB3.

When the configuration module 340 gets the released mutex, the object OB3 is changed. However, when the performance-polling module 370 gets the released mutex, the configuration module 340 waits until the performance-polling module 370 releases the mutex again, and cannot change the object OB3.

In the same way, when a predetermined object in the polling table is deleted, another module in competitive relation with the performance-polling table should get the mutex. Therefore, the deletion of the predetermined object cannot be performed until the competitive module gets the mutex. Because the procedure of deleting the predetermined object is almost the same with the procedure adding the predetermined object, detail descriptions for deleting the predetermined object is will be omitted in this application.

The above described non-intrusive data polling method uses a semaphore, or a variable treating process, besides the mutex, Therefore, the non-intrusive data polling method uses at least one of the mutex, semaphore, or the variable treating process. Detail descriptions about the application of the semaphore and the variable treating process will be omitted in this application because the technique shown above for the mutex would be similar to the technique that uses the semaphore or the variable treating process.

As described in the above statements, the non-intrusive data polling method utilizing the mutex, the semaphore or the variable treating process, prevents an operation failure in an object polling while changing the object, minimizes influences of the performance-polling module while adding or deleting the object to the polling table, and reduces overload in the performance-polling module by only searching the object in the polling table instead of the entire object.

Even though the above descriptions assume that the performance-polling module 370 is in the competitive data polling relation with the configuration module 340, or vice versa, another module, such as the alarm-polling module 350 can be in the competitive data polling relation with the performance-polling module 370 or the configuration module 340. Therefore, the present invention can also be applied.

While the invention has been particularly shown and described with reference to preferred embodiments thereof, it will be understood by those skilled in the art that the foregoing and other changes in form and details maybe made therein without departing from the spirit and scope of the invention.

What is claimed is:

1. A communication system, comprising:
    an entire object including a plurality of objects, connected with at least one network, and storing the data of said plurality of objects;
    a database including a polling table storing information for an object having data polling performed among said plurality of objects; and
    a mapping controller for controlling data flows of said entire object, and at least one of said plurality of objects of said polling table in said database, said mapping controller comprising:
        a configuration module performing data polling to, and managing said entire object;
        a performance module managing performance data of said entire object and for each of said plurality of objects;
        a performance-polling module calculating performance data by an alarm information for an alarm object generating an alarm among said plurality of objects, receiving the performance data accumulated in said entire object periodically, and informing the received performance data to said performance module; and
        a mutual exclusion module determining operating priority among all modules in a competitive data polling relation within said mapping controller.

2. The communication system according to claim 1, said mutual exclusion module including at least one member selected from a group consisting of a mutex, a semaphore, and a variable treating process.

3. The communication system according to claim 1, said mapping controller further comprising:
    an alarm-polling module performing alarm data polling to the alarm object of said entire object; and
    an alarm module managing a present alarm information.

4. The communication system according to claim 1, said mapping controller searches and monitors whether a data transmission line or said communication system operates normally or not, and synchronizes with an operation, administration and management unit monitoring whether data loss or operation failure exists or not, said operation, administration and management unit comprising:
    a usage parameter control unit monitoring object flows in each connection; and
    a head converter unit converting a virtual channel identification used in the transmission line to another virtual channel identification used in an output transmission line or the corresponding outputs.

5. The communication system according to claim 1, said usage parameter control unit monitoring object flows in each connection by monitoring the number of the objects per second.

6. A non-intrusive performance data polling method in a communication system comprising an entire object including multiple objects, connected with the networks, and storing the multiple object's own data; a database including a polling table storing information for an object having data polling performed among the multiple objects; and a mapping controller for controlling data flows of the entire object, and at least one of the multiple objects of the polling table in the database, wherein the mapping controller comprises a configuration module for performing data polling to, and for managing the entire object; a performance module for managing performance data of the entire object and for each of the multiple objects; a performance-polling module for calculating performance data by an alarm information for an alarm object generating an alarm among the entire objects, for receiving the performance data accumulated in the entire object periodically, and for informing the received performance data to the performance module; and a mutual exclusion module for determining operating priority among all modules in a competitive data polling relation within the mapping controller, the method comprising the steps of:
    storing the object in the entire object to be monitored to the polling table; and
    performing data polling to the object in the polling table, adding the object or the object data to the polling table, or deleting the object or the object data from the polling table.

7. The method according to claim 6, said mutual exclusion module uses at least one of a mutex, a semaphore, and a variable treating process, when performing data polling to the object in the polling table, adding the object or the object data to the polling table, or deleting the object or the object data from the polling table.

8. A method, comprising:
requesting a mutual exclusion module to perform performance data polling for a plurality of objects stored in a polling table of a database, said objects being connected with a communication system and supplying various data including performance data, said mutual exclusion module determining operating priority among all modules in a competitive data polling relation;
getting said mutual exclusion module to perform the performance data polling for the plurality of objects of said polling table when an available mutual exclusion module exists; and
releasing said mutual exclusion module, and waiting for a predetermined time after completing the performance data polling.
said mutual exclusion module being at least one member selected from a group consisting of a mutex, a semaphore, and a variable treating process.

9. The method according to claim 8, said acts of requesting, getting, and releasing being performed by a first module, said first module performing certain instructions, said first module being in a competitive data polling relation with a second module.

10. The method according to claim 9, said second module not changing the objects used by said first module until the releasing of said mutual exclusion module for said objects by said first module.

11. A method, comprising:
determining whether a mutual exclusion module for an object can be used, said object being one of a plurality of objects, said objects being connected with a communication system and supplying various data including performance data;
getting said mutual exclusion module for said object by a first module when said object is determined to be used, said first module performing a plurality of functions;
storing said object to a polling table; and
releasing said mutual exclusion module for said object from said first modules,
said mutual exclusion module being at least one member selected from a group consisting of a mutex, a semaphore, and a variable treating process.

12. The method according to claim 11, said first module being a performance-polling module calculating performance data by an alarm information for an alarm object generating an alarm among said plurality of objects, receiving the performance data accumulated in said entire object periodically, and informing the received performance data to said performance module, said first module being in a competitive data polling relation with a second module performing a certain set of functions.

13. The method according to claim 11, said first module being in a competitive data polling relation with a second module, said second module performing a certain set of functions.

14. The method according to claim 13, said second module not changing the objects used by said first module until the releasing of said mutual exclusion module for said objects by said first module.

15. The method according to claim 14, said mutual exclusion module including a mutex, the released mutex belonging to said second module having a high priority among a plurality of modules including said first and second modules, when said mutual exclusion module is released from said first module.

* * * * *